United States Patent [19]

Naddell et al.

[11] Patent Number: 5,711,010
[45] Date of Patent: Jan. 20, 1998

[54] METHOD OF ESTABLISHING ACCESS TO SECONDARY COMMUNICATION RESOURCES IN A COMMUNICATION SYSTEM

[75] Inventors: Marc C. Naddell, Schaumburg; Gary W. Grube, Barrington; Brian K. Bunkenburg, Chicago, all of Ill.

[73] Assignee: Motorola, Inc., Schaumburg, Ill.

[21] Appl. No.: 455,383

[22] Filed: May 31, 1995

[51] Int. Cl.⁶ .................................................. H04B 7/00
[52] U.S. Cl. ........................... 455/509; 455/517; 455/527
[58] Field of Search ............................ 455/34.1, 34.2, 455/54.1, 54.2, 58.2, 33.1, 509, 510, 512, 517, 518, 519, 520, 527; 379/63, 201, 202–205, 215

[56] References Cited

U.S. PATENT DOCUMENTS

| | | | |
|---|---|---|---|
| 4,649,567 | 3/1987 | Childress | 455/34.1 |
| 4,780,715 | 10/1988 | Kasugai | 455/58.2 |
| 4,827,499 | 5/1989 | Warty et al. | 455/34.1 |
| 5,287,551 | 2/1994 | Gustafson, Jr. et al. | 455/54.1 |
| 5,329,574 | 7/1994 | Nielson et al. | 455/34.1 |
| 5,335,353 | 8/1994 | Cizek et al. | 455/58.2 |
| 5,473,605 | 12/1995 | Grube et al. | 455/34.1 |
| 5,483,670 | 1/1996 | Childress et al. | 455/54.1 |
| 5,542,108 | 7/1996 | Sasuta | 455/34.1 |
| 5,551,062 | 8/1996 | Drozt et al. | 455/54.2 |
| 5,579,339 | 11/1996 | McClaughry | 455/54.2 |
| 5,613,207 | 3/1997 | Wilson et al. | 455/54.2 |

FOREIGN PATENT DOCUMENTS 4-348626  12/1992  Japan ................................. 455/34.1

*Primary Examiner*—Reinhard J. Eisenzopf
*Assistant Examiner*—Lester G. Kincaid
*Attorney, Agent, or Firm*—James A. Coffing; George C. Pappas

[57] ABSTRACT

In a radio communication system, a method of establishing access to a secondary communication resource includes the steps of identifying a need for such a resource, and requesting access to that resource while still engaged in a first communication. In particular, a first communication unit, being presently engaged in a first communication on a primary communication resource, allows the user to identify a present need for a secondary communication resource for the secondary communication resource. The communication unit is further made capable of requesting, during the first communication, access to the secondary communication resource.

15 Claims, 5 Drawing Sheets

METHOD OF ESTABLISHING ACCESS TO SECONDARY COMMUNICATION RESOURCES IN A COMMUNICATION SYSTEM

FIELD OF THE INVENTION

The present invention generally relates to radio communication systems, and in particular to establishing access to communication resources within such a system.

BACKGROUND OF THE INVENTION

Radio communication systems are known to include a multitude of communication units vying for a limited number of communication resources. The communication unit, which may be a mobile or portable radio, or a dispatch console station, transmit service requests when the need arises to use a communication resource. Such services include, but are not limited to, private calls, talk group calls, interconnect calls and dispatch calls. As is known, when a communication resource of the type being requested is available, a central controller assigns the available communication resource to the requesting communication unit. At that time, the communication unit engages in the desired communication (e.g. voice, data).

One problem in today's radio communication systems stems from the fact that service requests must be transmitted when the radio is idle. That is, a communication unit that is involved in a first communication cannot request a communication resource for a second communication, before the first communication is terminated. In an uncongested system, the foregoing scenario does not create any hardships. However, when the communication system becomes congested (i.e., service requests are often busied), the delay in being able to request a second communication resource may become problematic to the requesting communication unit.

This problem can be illustrated with a congested communication system that requires frequent resource queuing. For example, during a telephone conversation, a user might identify a need to send a facsimile transmission (i.e., fax) through the system using the communication unit. Without being able to act on the identified need, the user must first wait to conclude the present conversation before requesting the fax resource. For a congested system, this results in a queuing time that begins substantially after the need to be queued was identified.

Accordingly, a need exists for a radio communication system that avoids the shortcomings of the prior art. In particular, a radio communication system that permits a non-idle communication unit to identify and request access to a second communication resource while engaged in a first communication would be advantageous. Further, such a system that maintained a balanced request queue (i.e., one that avoided favoring of one communication unit over another) would be an improvement over the prior art.

DETAILED DESCRIPTION OF THE PREFERRED EMBODIMENT

The present invention encompasses a method of establishing access to a secondary communication resource in a communication system. In particular, a first communication unit that is engaged in a first communication on a primary communication resource is used by an operator that makes a decision to use a secondary communication resource upon completion of the first communication. After identifying a need for the secondary communication resource during the first communication, a request to access the secondary communication resource is transmitted from the first communication unit. In the foregoing manner, the present invention permits a time efficient method for reserving a communication resource for use upon termination of a call. Accordingly, priority is given to those communication unit users that first identify the need for resources, even though they may already be involved in another call.

Figure 1:
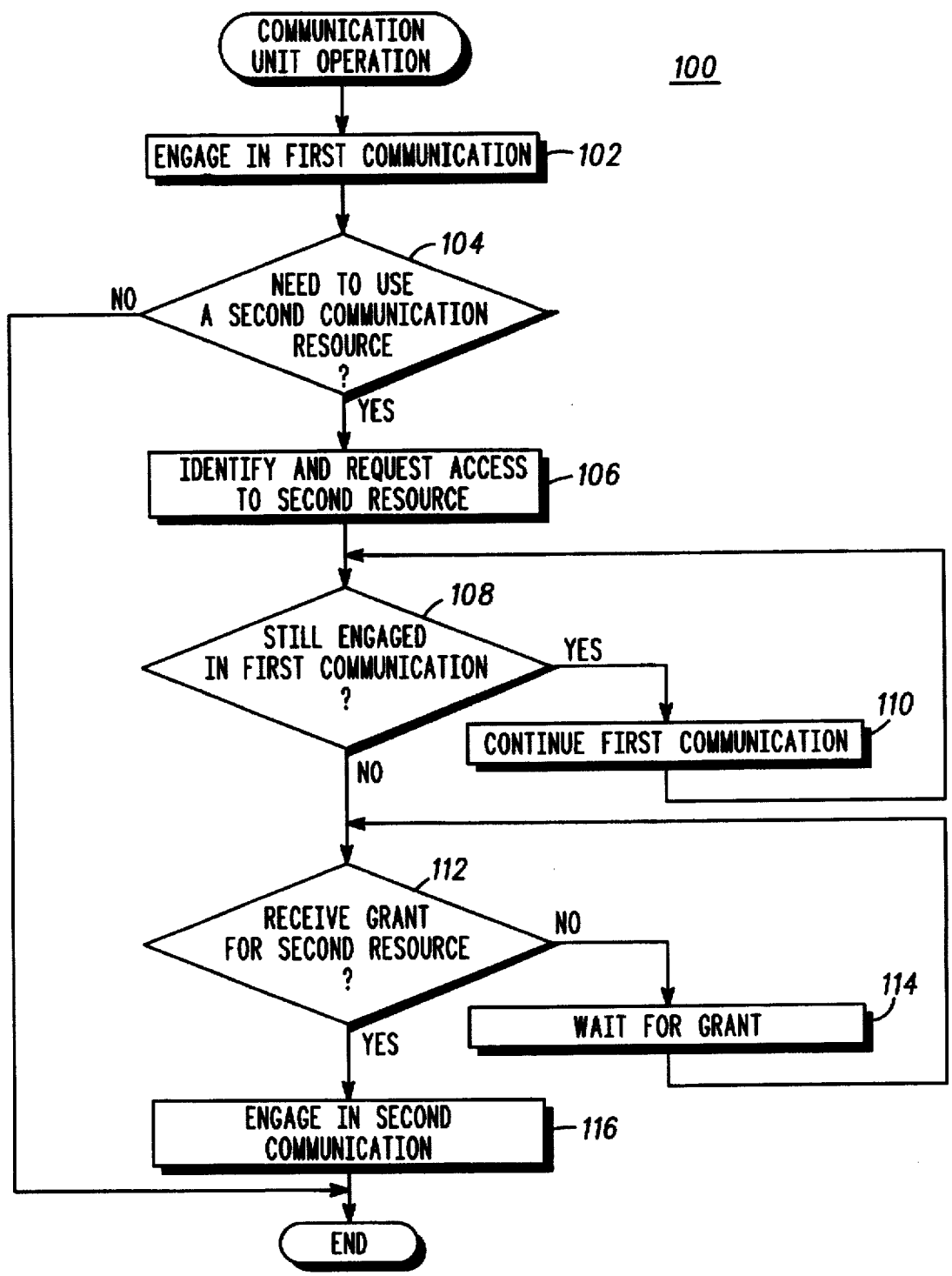
FIG. 1 shows a data flow diagram depicting operation of the communication unit, in accordance with the present invention.

The present invention can be better understood with reference to FIGS. 1–5. FIG. 1 shows a data flow diagram depicting operation of the communication unit, in accordance with the present invention. After a conventional request to use a first communication resource, the communication unit engages (102) in a first communication. A decision is then reached (104) to determine whether or not there is a need to use a second communication resource. This need can be identified in a number of ways, including recognizing a request command that is initiated by the user of the communication unit by an input mechanism (e.g., microphone, keypad). If the need to use a secondary resource does not arise during the first communication, the routine is exited in a conventional manner. However, when the need arises to use a secondary communication resource, the need is identified and access to the secondary communication resource is requested (106). In a preferred embodiment, this resulting queue position is governed by use of a resource hold timer, as later described. However, it is contemplated that the queue request is not so governed, thereby resulting in an indefinite allocation scheme where the request is queued until granted, or cancelled by the requestor. It is further contemplated that the queue position might be adjusted on the basis of a predetermined priority scheme, where some communication units have a higher priority level than others. In this manner, a system can be developed that utilizes the present invention while still recognizing the importance of having predetermined priority schemes.

The communication unit remains (108, 110) engaged in the first communication until completion thereof. That is, since the user can terminate the first communication as desired, the secondary communication is given lesser priority, and will not interrupt the first communication. In a preferred embodiment, this priority scheme applies to all secondary communications, regardless of number.

Upon completion of the first communication, the communication unit tests (112) for the receipt of a grant to the second resource, and waits (114) therefore. Theoretically, the communication unit can await the allocation of the second resource indefinitely, as a queue is used to allocate resources that become available. However, a preferred embodiment relies on timestamps and priority levels, as later described, to efficiently queue the units awaiting a resource. Similarly, hold timers are used to ensure that "held" resources are not wasted by being kept out of circulation for excessively long periods of time. Upon receipt of the grant to the second communication resource, the communication unit engages (116) in a second communication, in conventional manner, and the routine is exited.

Figure 2:
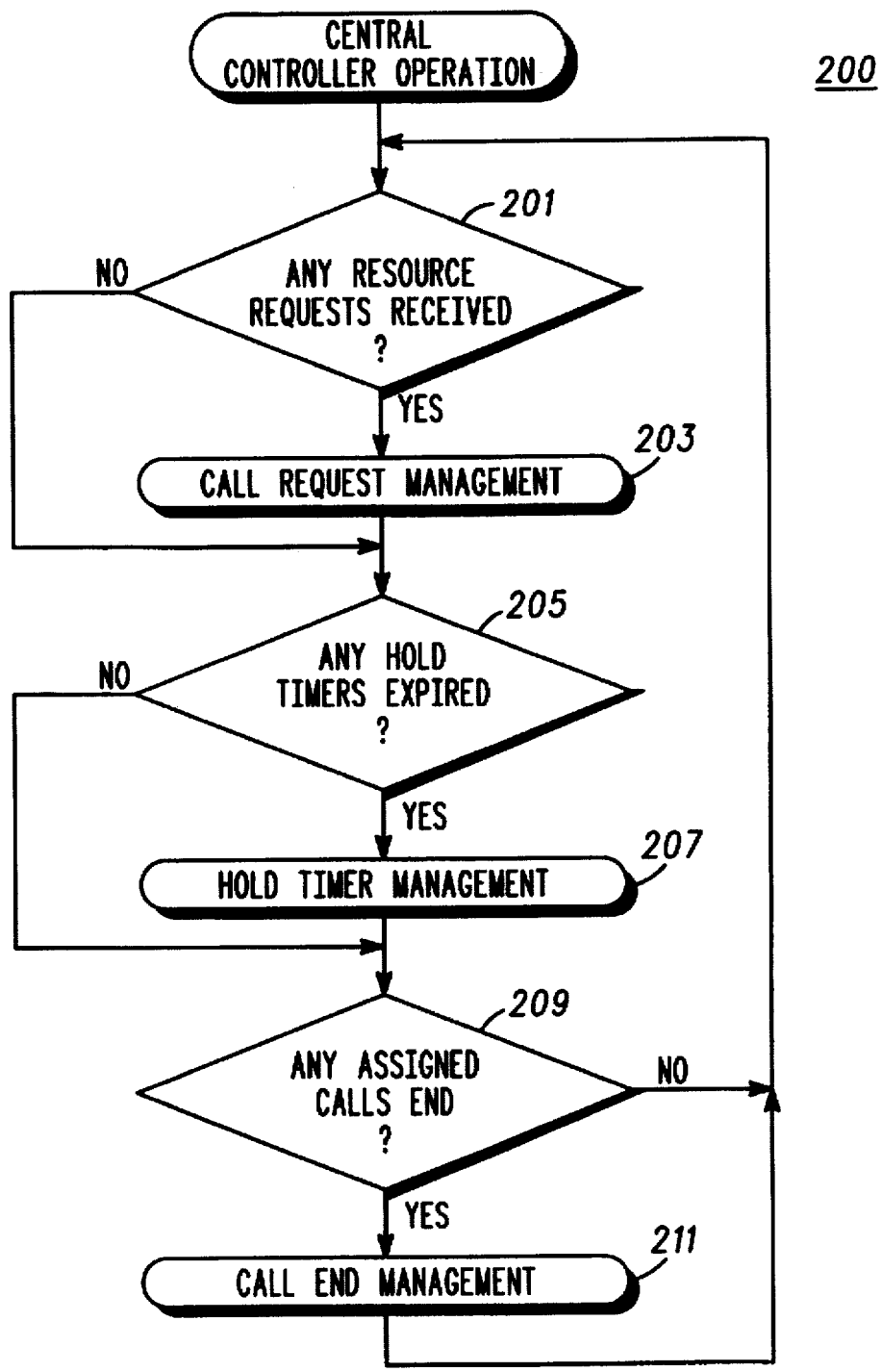
FIG. 2 shows a data flow diagram depicting operation of the central controller, in accordance with the present invention.

FIG. 2 shows a data flow diagram 200 depicting the operation of the central controller, in accordance with the present invention. Operation of the central controller begins by checking (201) for the receipt of a resource request. Upon receipt of a resource request, the Call Request Management process (203) is invoked, where the request is identified as being either primary or secondary and resources are allocated based on the requested call type and system status. After the Call Request Management process, the hold timers—used to reserve resources for secondary calls, as later described—are checked (205) to determine whether any have expired. Upon the expiration of a hold timer, the Hold Timer Management routine (207) is invoked to determine whether the resource associated therewith should continue to be held or, in the alternative, be reassigned. When one of the presently assigned calls end (209), the central controller uses the Call End Management process (211) to allocate or reserve the resource for identified units requesting a system resource.

Figure 3:
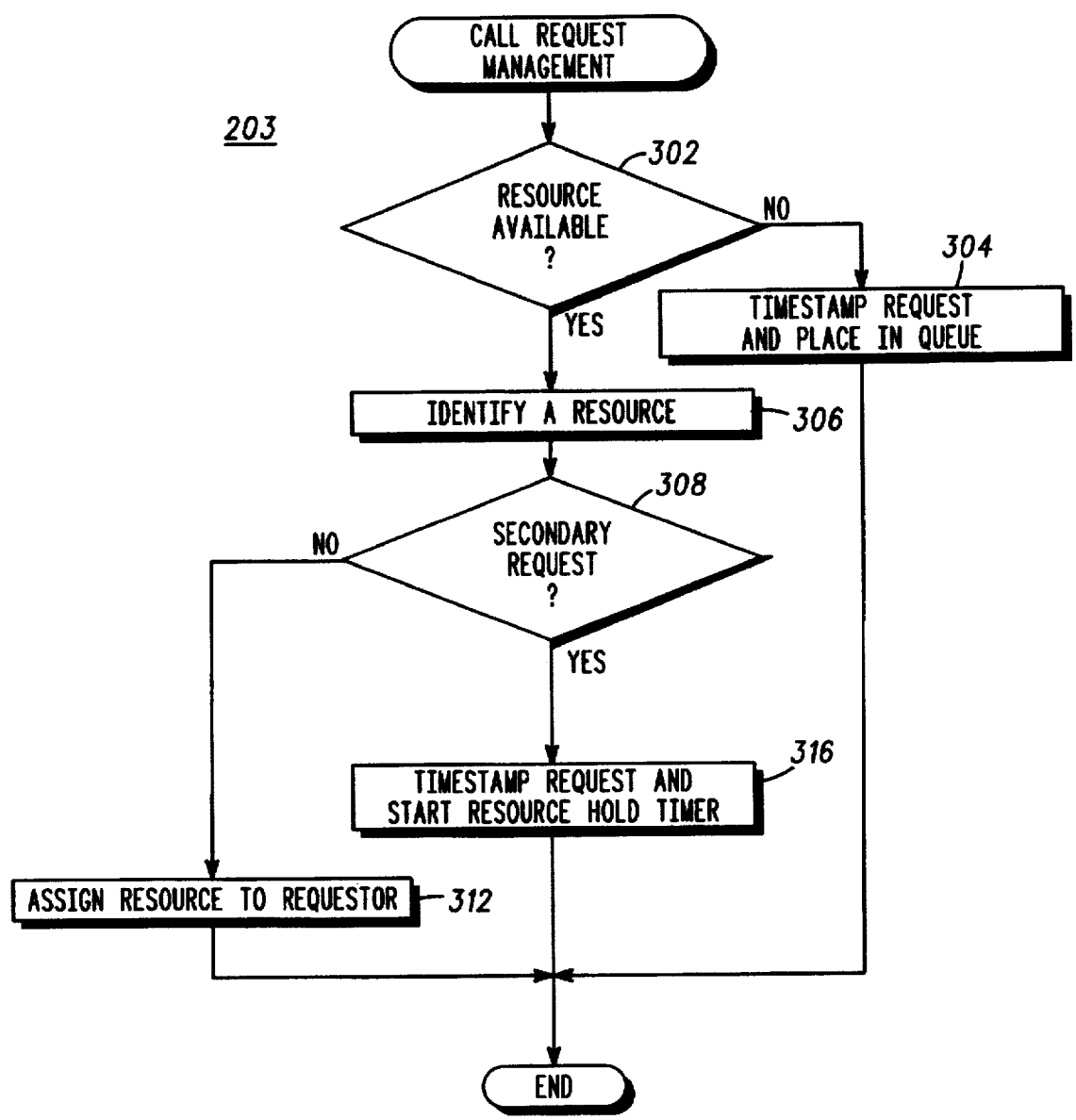
FIG. 3 shows a more detailed depiction of the call request management routine shown in FIG. 2.

FIG. 3 shows a more detailed depiction of the Call Request Management routine (203) shown in FIG. 2. In response to an incoming resource request, a decision is reached to determine (302) whether or not a communication resource of the type requested is available. When the appropriate resource is not available, the request is time stamped (304) and placed in the request queue, before the routine is exited. When the resource is available, the resource is identified (306), before a decision is reached to determine (308) whether the request is primary or secondary. It should be noted that, according to the present invention, a primary request denotes a request for a communication resource to begin a call from an idle state. That is, the requesting unit is not presently involved in a call or in a queue. By contrast, a secondary request is used to request additional resources required for communications to take place when an existing (i.e., primary) call is terminated. If the request is a primary request (i.e., not a secondary request) the resource is assigned (312) to the primary requestor before the routine is exited.

Upon detection of a secondary request, the request is time stamped (316) and a resource hold timer is started, for use as next described. In a preferred embodiment, hold timers are used to facilitate efficient allocation of resources by the fixed-end system controller. Further, a preferred methodology would allow for different hold timer values depending on the priority levels of users, types of secondary requests being made, and the capability of the system being used. For example, the hold timer for a secondary request from high priority users may be set for up to one minute, while for low priority users the hold timer might be set for as little as 15 seconds. As regarding call types, a hold timer value might range from 2 minutes (e.g., dispatch call), down to only 15 seconds e.g., telephone interconnect call). Additionally, system status might impact hold timer values, such that an under-utilized system might allow hold timer values up to 3 minutes, while an over-capacity system might reduce hold timers to 10 seconds. The present invention contemplates these values being either predetermined, or variable, depending on the system loading condition.

Figure 4:
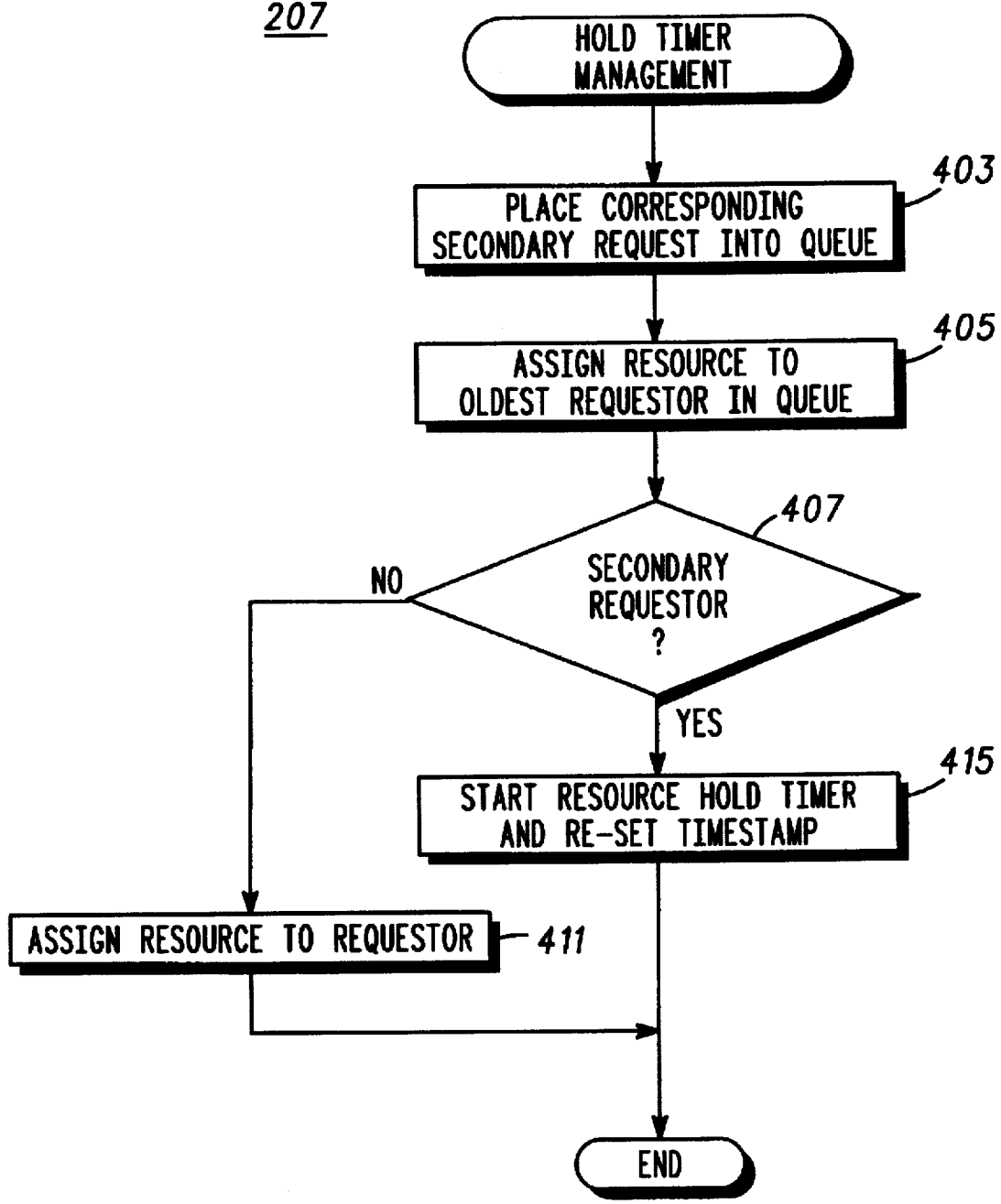
FIG. 4 shows a more detailed depiction of the hold timer management routine shown in FIG. 2.

FIG. 4 shows a more detailed depiction of the Hold Timer Management routine (207) shown in FIG. 2. Upon expiration of a hold timer, the secondary request corresponding to the expired hold timer is placed (403) into the queue. That is, the freed resource becomes available for the other queued requests. The oldest requestor in the queue is then identified (405), so that the freed resource can be assigned to the requestor that has been waiting the longest. Once the oldest requestor has been identified, a decision (407) is reached to determine whether the requestor is a secondary requestor or a primary requestor. If the requestor is found to be nonsecondary (i.e., primary), the freed resource is assigned (411) to that requestor, before the routine is exited, since primary requests generally have priority over secondary requests.

If the requestor is found to be secondary, a corresponding resource hold timer is then started (415) and the corresponding timestamp is reset. In this manner, the system controller provides a resource hold timer for the secondary request, thereby giving users engaged in primary communications the ability to act on identified needs for secondary communications. The hold timer operates as previously described, with it's duration being periodically checked by the central controller.

Figure 5:
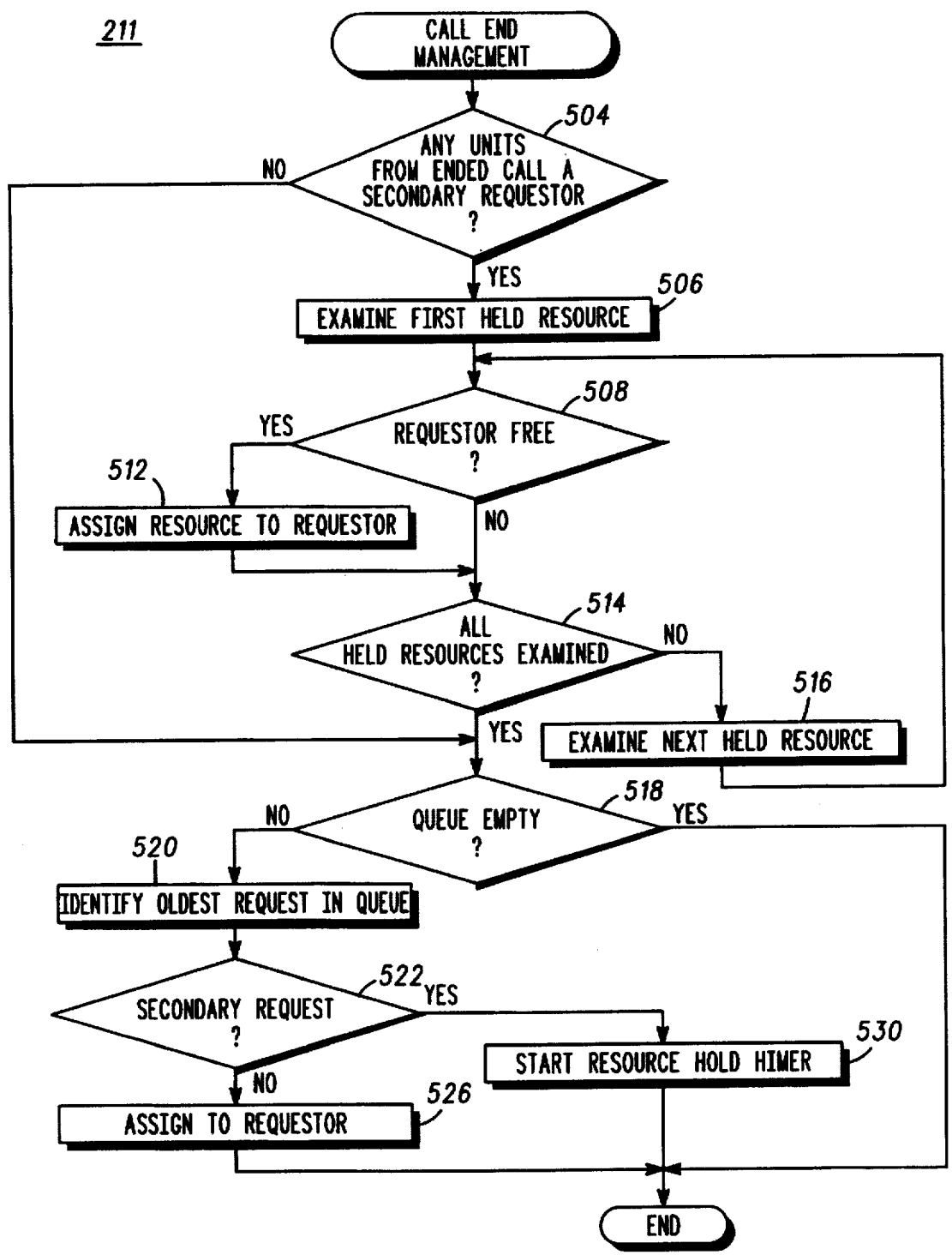
FIG. 5 shows a more detailed depiction of the call end management routine shown in FIG. 2.

FIG. 5 shows a more detailed depiction of the call end management routine (211) shown in FIG. 2. When a resource becomes available, the central controller determines (504) whether any of the units from the terminated call are themselves making a secondary request, and therefor becoming eligible for resource assignment for their secondary requests. The central controller then examines (506, 514, 516) the held resources until one of the requestors for that resource are determined (508) to be free for assignment (i.e., no longer in primary call from which secondary request was made). When one of the requestors is found to be free, the newly available resource is then assigned (512) to that requestor. After, all of the held resources have been examined, the queue is checked (518) to determined whether or not it is empty. If the queue is found to be empty (i.e., all primary and secondary requests granted), the routine is exited, and the central controller returns to the standby state shown in FIG. 2 to look for incoming requests.

If the queue is not empty, the oldest queued requestor is then identified (520), e.g., through the use of the timestamp mechanism described with respect to FIG. 3, and a check is made to determine (522) whether the request is a secondary request. If the oldest request is determined to be for a primary request, then the resource is assigned to the requestor (526) and the routine is exited. However, if the oldest request is for a secondary resource, then the hold timer for that resource is started (530), so that the resource will be held for that requestor until expiration thereof.

In summary, the present invention solves the existing problems surrounding the communication system user's ability to act on identifiable future resource needs. Upon determining a need for a secondary communication, and without having to wait until a present communication is terminated, the user can reserve a place in a busy queue for the secondary communication. Available resources can be temporarily held for the queued secondary communications, while a variety of timer values can be used to regulate the impact of these holds. Lastly, the invention enhances end-user productivity by rewarding users who identify their communication resource needs to the system in advance.

What is claimed is:

1. In a communication system including a central controller and at least a first communication unit, a method of assigning to the first communication unit, while said first communication unit is presently participating in a first communication on a primary communication resource, a secondary communication resource different from primary communication resource, to allow the first communication unit to participate in a desired communication immediately after the secondary resource becomes available and upon termination of the first communication, the method comprising the central controller performed steps of:

identifying, while the first communication is still active, a request, from the first communication unit for the secondary communication resource;

identifying when the resource becomes available;

reserving, while the first communication is still active, the secondary resource for the first communication unit when the secondary communication resource becomes available; and assigning the secondary resource to the first communication unit when the first communication is terminated.

2. The method of claim 1, further comprising the step of placing the request in a request queue when the second resource is unavailable.

3. The method of claim 2, further comprising the step of identifying a priority level for the first communication unit.

4. The method of claim 3, further comprising the step of adjusting a position of the request in the request queue based, at least in part, on the priority level.

5. The method of claim 4, wherein the step of reserving involves starting a resource hold timer.

6. The method of claim 5, further comprising the steps of:

identifying, at expiration of the resource hold timer, that a second communication unit is temporarily assigned a reservation for the secondary communication resource; and reassigning the reservation so that the first communication unit is assigned the secondary resource when the first communication is terminated.

7. The method of claim 6, wherein the step of identifying a request from the first communication unit involves identifying a request command from the first communication unit asserted by an input mechanism coupled thereto.

8. The method of claim 7, wherein said input mechanism is a keypad and said request command is a keypad asserted command.

9. The method of claim 1, further comprising the step of identifying a priority level for the first communication unit.

10. The method of claim 1, wherein the step of reserving involves indefinitely allocating the secondary communication resource to the first communication unit.

11. The method of claim 1, wherein the step of reserving involves starting a resource hold timer.

12. The method of claim 11, further comprising the steps of;

identifying, at expiration of the resource hold timer, that a second communication unit is temporarily assigned a reservation for the secondary communication resource; and reassigning the reservation so that the first communication unit is assigned the secondary resource when the first communication is terminated.

13. The method of claim 12, further comprising the step of placing the request in a request queue when the second resource is unavailable.

14. The method of claim 1, wherein the step of identifying a request from the first communication unit involves identifying a request command from the first communication unit asserted by an input mechanism coupled thereto.

15. The method of claim 14, wherein said input mechanism is a keypad and said request command is a keypad asserted command.

\* \* \* \* \*

UNITED STATES PATENT AND TRADEMARK OFFICE
CERTIFICATE OF CORRECTION

PATENT NO. : 5,711,010
DATED : January 20, 1998
INVENTOR(S) : Marc C. Naddell, Gary W. Grube and Brian Bunkenburg It is certified that error appears in the above-indentified patent and that said Letters Patent is hereby corrected as shown below:

Col. 4, line 65, after "unit," please insert --in a non-handover condition--.

Col. 5, line 8, please delete the comma after the word"request" and between the words "unit" and "for" please insert --, made during the course of the first communication,--.

On line 10, between the words "the" and "resource" please insert the word --secondary--.

On line 14 please delete the word --and--.

On line 15, please add a new paragraph before the word assigning --identifying when the first communication is terminated; and On line 16, after the word "assigning" please insert --, during a non-handoff condition,--.

On line 17, please delete the word "when" and insert thereat --in response to--; and please delete the word "is" and insert thereat --being--.

Signed and Sealed this

Twenty-third Day of June, 1998

Attest:

BRUCE LEHMAN

*Attesting Officer*  *Commissioner of Patents and Trademarks*